US008954372B2

(12) United States Patent
Biehl et al.

(10) Patent No.: US 8,954,372 B2
(45) Date of Patent: Feb. 10, 2015

(54) SYSTEM AND METHODS FOR USING PRESENCE DATA TO ESTIMATE AFFECT AND COMMUNICATION PREFERENCE FOR USE IN A PRESENCE SYSTEM

(75) Inventors: Jacob Biehl, San Jose, CA (US); Eleanor Rieffel, Redwood City, CA (US); Althea Turner, Menlo Park, CA (US); William Van Melle, Los Altos, CA (US); Anbang Xu, Champaign, IL (US)

(73) Assignee: Fuji Xerox Co., Ltd., Tokyo (JP)

( * ) Notice: Subject to any disclaimer, the term of this patent is extended or adjusted under 35 U.S.C. 154(b) by 412 days.

(21) Appl. No.: 13/354,414

(22) Filed: Jan. 20, 2012

(65) Prior Publication Data

US 2013/0191319 A1    Jul. 25, 2013

(51) Int. Cl.
| | | |
|---|---|---|
| G06F 9/44 | (2006.01) | |
| G06N 7/02 | (2006.01) | |
| G06N 7/06 | (2006.01) | |
| G06N 5/04 | (2006.01) | |
| G06N 99/00 | (2010.01) | |

(52) U.S. Cl.
CPC .. *G06F 9/44* (2013.01); *G06N 5/04* (2013.01); *G06N 7/02* (2013.01); *G06N 7/06* (2013.01); *G06N 5/048* (2013.01); *G06N 99/005* (2013.01)
USPC .......................................................... 706/52

(58) Field of Classification Search
CPC .............. G06F 9/44; G06N 7/02; G06N 7/06; G06N 5/048; G06N 5/04; G06N 99/005
USPC ......................... 706/52, 46, 45, 62
See application file for complete search history.

(56) References Cited

U.S. PATENT DOCUMENTS

| | | | |
|---|---|---|---|
| 7,921,369 B2 | 4/2011 | Bill | |
| 7,930,676 B1 | 4/2011 | Thomas | |
| 7,953,809 B2 | 5/2011 | Lau et al. | |
| 8,004,391 B2 | 8/2011 | Cruz Hernandez | |
| 8,319,816 B1 * | 11/2012 | Swanson et al. | 348/14.01 |
| 8,589,069 B1 * | 11/2013 | Lehman | 701/438 |
| 2002/0178161 A1 * | 11/2002 | Brezin et al. | 707/10 |
| 2004/0229560 A1 * | 11/2004 | Maloney | 455/3.01 |
| 2005/0080897 A1 * | 4/2005 | Braun et al. | 709/225 |
| 2006/0117094 A1 * | 6/2006 | Li | 709/219 |
| 2006/0190464 A1 * | 8/2006 | Yamamoto | 707/100 |
| 2006/0277467 A1 * | 12/2006 | Reponen et al. | 715/708 |

(Continued)

OTHER PUBLICATIONS

Quercia et al, "Using Mobile Phones to Nurture Social Networks", Pervasive Computing, Published by the IEEE CS, Jul.-Sep. 2010.*

(Continued)

*Primary Examiner* — Jeffrey A Gaffin
*Assistant Examiner* — Ilya Traktovenko
(74) *Attorney, Agent, or Firm* — Sughrue Mion, PLLC

(57) ABSTRACT

Exemplary embodiments described herein are directed to systems and methods that estimate a user's affect and communication preferences from presence data. The exemplary embodiments use a small set of features derived from a user's recent high level presence states. Exemplary embodiments also use features from broader classes of presence data. Utilizing features from a combination of presence data and recent presence states may provide improvement over estimates that users are able to make themselves. The exemplary embodiments further consider cost, burden on the user, and privacy issues in estimating affect and communication preferences.

21 Claims, 7 Drawing Sheets

(56) References Cited

U.S. PATENT DOCUMENTS

| | | | |
|---|---|---|---|
| 2008/0155476 A1* | 6/2008 | Forbes et al. | 715/835 |
| 2010/0185064 A1* | 7/2010 | Bandic et al. | 600/306 |
| 2010/0205129 A1* | 8/2010 | Aaron et al. | 706/14 |
| 2010/0235524 A1* | 9/2010 | Klemm et al. | 709/228 |
| 2010/0262716 A1* | 10/2010 | Sinitsyn et al. | 709/248 |
| 2011/0066688 A1* | 3/2011 | Pinding | 709/206 |
| 2011/0072448 A1* | 3/2011 | Stiers et al. | 725/10 |
| 2011/0173260 A1 | 7/2011 | Biehl et al. | |
| 2011/0307562 A1* | 12/2011 | Chakra et al. | 709/206 |
| 2012/0059787 A1* | 3/2012 | Brown et al. | 706/52 |
| 2012/0071087 A1* | 3/2012 | Griffin et al. | 455/41.1 |
| 2012/0089698 A1* | 4/2012 | Tseng | 709/217 |

OTHER PUBLICATIONS

Aoidh et al, "Analysing Mouse Movements to Infer Spatial Interests", Proceedings of the Geographical Information Science Research UK Conference, GISRUK 2007, National Centre for Geocomputation National University of Ireland Maynooth Apr. 11-13, 2007.*

Adam Bermingham et al., "Classifying Sentiment in Microblogs: Is Brevity an Advantage?", 2010, pp. 1833-1836, CIKKM, Toronto, Ontario, Canada.

Andreas Krause et al., "Context Aware Mobile Computing: Learning Context-Dependent Personal Preferences from a Wearable Sensor Array", IEEE Transactions on Mobile Computing, 2006, Vo. 5, No. 2, pp. 1-15.

Atsunori Minamikawa et al., "Blog Tells What Kind of Personality You Have: Egogram Estimation from Japanese Weblog", 2011, pp. 217-220, CSCW, Hangzhou, China.

Brian Y. Lim et al., "Show Me a Good Time: Using Content to Provide Activity Awareness to Collaborators with ActivitySpotter", 2010, pp. 263-272, Group, Sanibel Island, Florida, USA.

Clayton Epp et al., "Identifying Emotional States using Keystroke Dynamics", 2011, pp. 715-724, CHI, Vancouver, BC, Canada.

Eric Horvitz et al., "Learning and Reasoning about Interruption", 2003, pp. 20-27, ICMI, Vancouver, BC, Canada.

Eric Horvitz et al., "Models of Attention in Computing and Communication: From Principles to Applications", CACM, 2003, pp. 52-59.

James Fogarty et al., "Examining Task Engagement in Sensor-Based Statistical Models of Human Interruptibility", 2005, pp. 331-340, CHI, Portland, Oregon, USA.

Jeffrey Hancock et al., "I'm Sad You're Sad: Emotional Contagion in CMC", 2008, pp. 295-298, CSCW, San Diego, California, USA.

Jin-Hyuk Hong et al., "ConaMSN: A context-aware messenger using dynamic Bayesian networks with wearable sensors", Expert Systems with Applications 37, 2010, pp. 4680-4686.

Joshua Hailpern et al., "The CLOTHO Project Predicting Application Utility", 2010, pp. 330-339, DIS, Aarhus, Denmark.

Karen Church et al., "A Study of Mobile Mood Awareness and Communication through MobiMood", 2010, pp. 128-137, NordiCHI, Reykjavik, Iceland.

Nuria Oliver et al., "Selective Perception Policies for Guiding Sensing and Computation in Multimodal Systems: A Comparative Analysis", 2003, pp. 36-43, ICMI, Vancouver, BC, Canada.

Nuria Oliver et al., "SWISH: Semantic Analysis of Window Titles and Switching History", 2006, pp. 194-201, IUI, Sydney, Australia.

Petra_Fagerberg et al., "eMoto: emotionally engaging interaction", 2004, Personal Ubiquitous Computing, pp. 377-381.

Rosalind Picard, "Affective Computing", 1997, pp. 1-45, Massachusetts Institute of Technology.

Shamsi Iqbal et al., "Effects of Intelligent Notification Management on Users and Their Tasks", CHI, 2008, pp. 93-102, Florence, Italy.

Stephen Voida et al., "Re-framing the Desktop Interface Around the Activities of Knowledge Work", 2008, pp. 211-220, UIST, Monterey, California, USA.

* cited by examiner

FIG. 2a

| | STRONGLY DISAGREE | DISAGREE | NEUTRAL | AGREE | STRONGLY AGREE |
|---|---|---|---|---|---|
| I AM NOW AVAILABLE ... | | | | | |
| ... FOR AN EXPECTED COMMUNICATION REQUEST | | | | | |
| ... FOR AN UNEXPECTED COMMUNICATION REQUEST | | | | | |
| ... TO HELP A COLLEAGUE ON A SIMPLE TASK | | | | | |
| ... TO HELP A COLLEAGUE ON A COMPLEX TASK | | | | | |

☐ EMAIL
☐ FACE-TO-FACE
☐ PHONE
☐ IM CHAT

FIG. 2c

| | | | | EXCITED | | | | | |
|---|---|---|---|---|---|---|---|---|---|
| | | | ○ | ○ | ○ | ○ | | | |
| | | ○ | ○ | ○ | ○ | ○ | ○ | | |
| | ○ | ○ | ○ | ○ | ○ | ○ | ○ | ○ | |
| AROUSED ○ | ○ | ○ | ○ | ○ | ○ | ○ | ○ | ○ | PLEASANT |
| ○ | ○ | ○ | ○ | ○ | ○ | ○ | ○ | ○ | |
| STRESSED ○ | ○ | ○ | ○ | ○ | ○ | ○ | ○ | ○ | RELAXED |
| | ○ | ○ | ○ | ○ | ○ | ○ | ○ | ○ | |
| | | ○ | ○ | ○ | ○ | ○ | ○ | ○ | |
| | | | ○ | ○ | ○ | ○ | ○ | | |
| | | | | UNPLEASANT | | ○ | ○ | SLEEPY | |
| | | | | | DEPRESSED | | | | |

SYSTEM AND METHODS FOR USING PRESENCE DATA TO ESTIMATE AFFECT AND COMMUNICATION PREFERENCE FOR USE IN A PRESENCE SYSTEM

BACKGROUND

1. Field

Exemplary embodiments described herein are related to presence systems, and more specifically, for utilizing the presence data to estimate affect and communication preference of a user.

2. Related Art

Communication in the current workplace has moved far beyond face-to-face communication. Workers frequently consult and collaborate with others on a variety of tasks via technology-mediated channels such as email, instant messaging (IM), phone and video conferencing. These communication media offer fewer cues than face-to-face as to how best collaboration should be carried out. In these settings it is often harder for users to estimate other users' emotional state, which sorts of tasks and communication they are open to at the present time, and which communication medium they would prefer to use for such communication.

Presence systems in the related art may use a display of photo tiles with colored borders to indicate the current presence state of a user (e.g. location, current status, etc.), with the ability to view more detailed information on the user (e.g., contact information, calendar data, and communication tools are currently available for each individual). Such related art systems may also provide interaction choices to extend the current awareness information of the initiator and to facilitate a structured negotiation for a time and medium for a future conversation given awareness information about each individual.

The strength of the related art presence systems is in enabling users to estimate the availability of other users, both online and offline. Presence systems that provide medium preference estimates in addition to availability estimates would provide enhanced workplace communication and collaboration by, for example, enabling users to better determine if this is a good time to contact another user and, if so, through what means. Such presence systems may also be able to estimate of users' emotional states, their preferences in terms of how complex a communication task they are willing to participate in at the moment, and their preferred medium to do so.

Prediction systems in the related art predict the affect and communication preference of the user. Related art affect prediction has taken many different approaches to selecting evidence for predicting affect of a user. Affect prediction in the related art presumes that affective information could be deduced from various indicators, including facial expressions, gestures, vocal intonation, language and physiological factors. Methods in the related art used to derive evidence for predicting affect consider physiological factors; visual identification based on facial expressions, gesture, and pose; behavioral measures; direct or indirect user input, such as user profiles; and external sources, such as information from environmental sensors or databases. Such related art measures vary on their invasiveness, ease of use and automaticity.

Wearable sensor devices in the related art collect information regarding pupil dilation, arm movement, skin temperature, and heat flux, to infer the users' affective states. However, adding wearable sensors significantly increases the cost of a presence system and face user adoption issues as well. Users are unlikely to wear such devices for the sole purpose of providing affect information to a presence system.

Other related art methods use mood as an addition to an instant message buddy list, thereby allowing users to see the their buddies' moods, to search by mood or organize their lists by mood. Such methods use a camera-based system to recognize facial expressions and some limited gestures. These related art methods do not require users to take any actions to implement it, other than having a camera monitoring them.

The related art has also considered the user behaviors as a determinant of user affect. For example, affect can be linguistically inferred in the textual domain (e.g. text-based chat, weblog, and microblog) via word choice, word count, punctuation, and timing. However, access to the verbal content of these applications has significant privacy issues, which negatively impact their adoption and use, and is applicable only in situations where textual data is available.

Related art methods also utilize keystroke dynamics to determine users' affective states. Their method is much less invasive since it does not use that specific content, and is thus more likely to be accepted by people than methods requiring wearable sensor-based methods or text analysis. Unfortunately, their prediction model only performs well when the users type a pre-specified phrase. However unlikely it is that users would adopt wearable sensors to enable the deduction of affect information, it is even more unlikely that they would pause every few minutes to type a set phrase. In addition, even an improved method would have limited applicability, since even active computer users are not typing all the time.

A more promising approach in the related art uses external sources to predict affect. Such related art approaches use activity sensing to infer the cost of interruption. Those related systems can not only recognize office activities but also make automated decisions to defer routing communication requests, such as phone calls, based on a contactees' cost of interruption.

Contextual information including availability, interruptibility, breakpoints, and activity content can help workers decide when to contact their colleagues. Related art systems that use contextual information can identify and abstract a user's activity content (topic) from the accessed documents. The shared activity information can influence users' contact desire.

Additional related art systems also detect mood and support explicit mood sharing. Social mobile applications in the related art support explicit mood input and sharing among groups of friends. The affective information can be visually represented by color, words, and visual icons.

SUMMARY

Aspects of the exemplary embodiments include a method, which involves determining presence data of a user; deriving features from the presence data; applying an estimation model to the derived features; and estimating affect and a communication preference based on the applying.

Additional aspects of the exemplary embodiments include a non-transitory computer readable medium storing instructions for execution by a processor, which includes determining presence data of a user; deriving features from the presence data; applying an estimation model to the derived features; and estimating affect and a communication preference based on the applying.

Additional aspects of the exemplary embodiments include an apparatus, which includes a determining unit that determines presence data of a user; a deriving unit that derives features from the presence data; an applying unit that applies an estimation model to the derived features; and an estimating unit that estimates affect and a communication preference based on the applying. The units may be executed by one or more processors.

BRIEF DESCRIPTION OF THE DRAWINGS

These, and or/other aspects will become more readily appreciated from the following description of the embodiments, taken in conjunction with the accompanying drawings, in which:

FIGS. 2(a) to 2(c) illustrate examples of questions in a survey to collect data from a user, in accordance with an exemplary embodiment.

DETAILED DESCRIPTION OF THE INVENTION

The intuition behind the exemplary embodiments is that various features (e.g. how many presence state changes a user has experienced recently, which presence states a user has recently been in, current presence state, etc.) give hints at both a user's mood and a user's current communication preferences. This intuition suggests that a system with access to the recent history of a user's presence states can estimate of a person's mood. Thus, by making use of the sort of presence information collected by a presence system, additional estimates can be made to further aid communication and collaboration in the workplace.

The exemplary embodiments focus on external sources that require no action by users to determine affect, specifically, the properties of a user's presence state over time. In addition, the exemplary embodiments consider selected user behaviors, such as desktop activity (e.g. the number of opened windows), which has been used to predict the cost of interruption, users' tasks and workflow, and the usefulness of applications.

While the primary application of these methods is to enhance presence systems, these methods are applicable to a wide array of related systems including, but not limited to, email, instant messaging, VOIP and cell phone communication, video conferencing, and social networking platforms.

Figure 1:
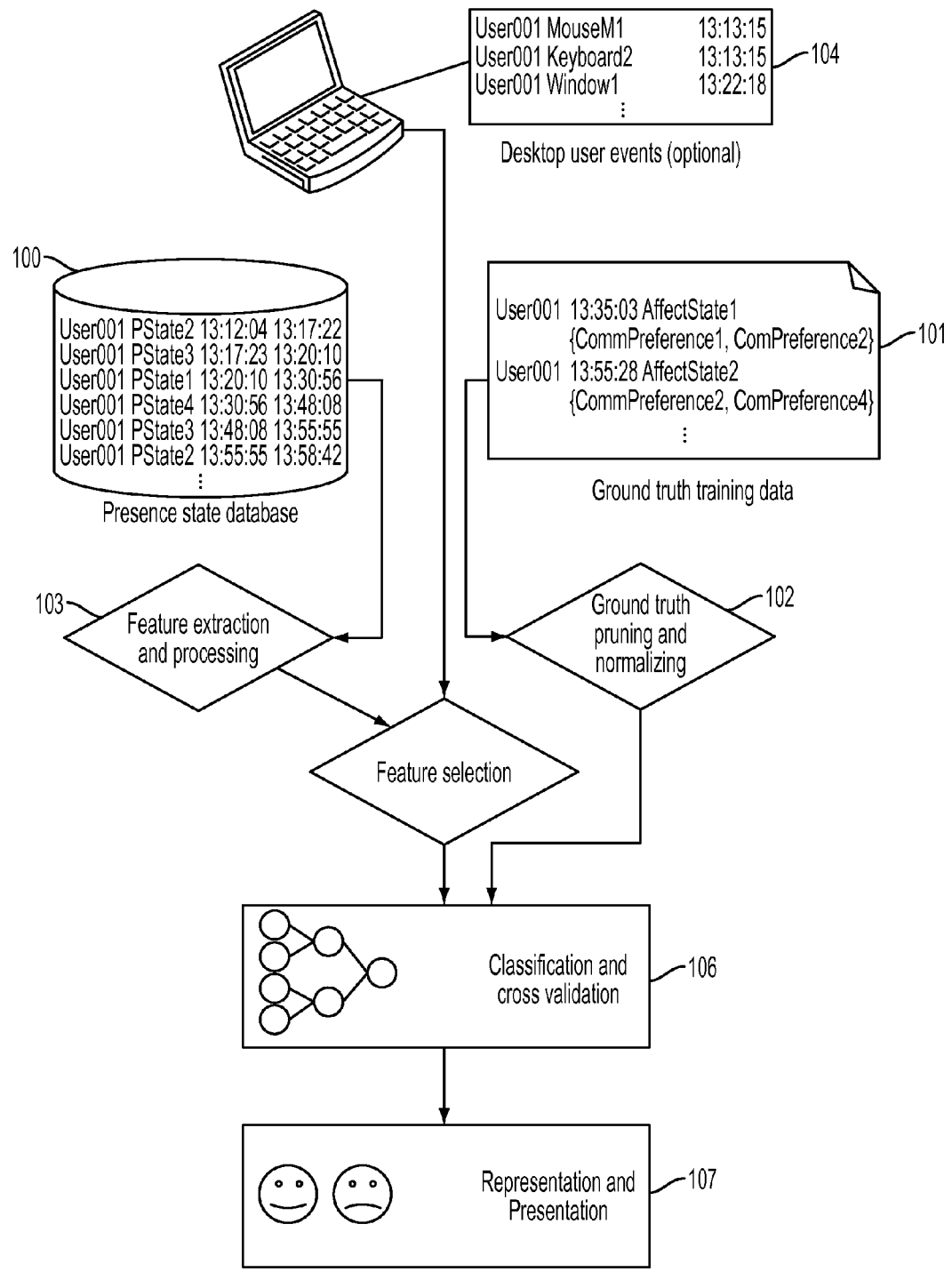
FIG. 1 illustrates a diagram of the system organization, in accordance with an exemplary embodiment.

FIG. 1 illustrates a diagram of the system organization, in accordance with an exemplary embodiment.

The exemplary embodiments utilize presence systems that stream presence states. These presence states represent a high-level presence state for a current user. For instance, presence states in exemplary embodiments include: in the office, in the building, connected remotely, available on mobile device, with visitor and no information. In addition to the state, the date and time of when the user entered and exited the presence state are recorded. All presence state data is stored in a database 100 such as SQL database.

Presence states include data gathered directly from a user. In accordance with exemplary embodiments, each data point may contain the time at which the user reported, or the system automatically collected, the data and the user's current self-reported affect state across the dimensions of pleasure and arousal, current preferences for preferred communication channel, and ratings of willingness to engage in each of four different types of interruptions from a colleague (expected, unexpected, simple task, complex task). The timestamp allows for matching the user data to the data automatically collected by the exemplary embodiments for this time period.

In accordance with exemplary embodiments, ground truth training data 101 is collected and then processed as shown at 102 in three steps. First, for each of the two affect dimensions, the ratings the users specified on a nine point scale are collapsed into three categories: positive, negative, and neutral. Second, because the data may be heavily weighted toward positive or negative ratings in both dimensions, random sampling of ground truth data would have a sample bias. To eliminate class skew, the exemplary embodiments conduct under-sampling, which randomly removes samples from the majority classes to equal the class with the fewest instances. This creates a uniform distribution between positive and negative examples. Finally, the presence state data is normalized for each user, for each feature using z-scores to account for individual differences.

At 103, features can be extracted from the presence state. In accordance with exemplary embodiments, five main features can be used to provide predictive power for affect and for the preferred communication channel. Specifically, for each ground truth data point, a select query is run on a database of presence states to return results for a given time window. In this example, an SQL database is used containing the 20 minutes prior to a ground truth data point's time stamp. Enumerations are run on this data in order to derive the following features: 1) total number of presence states entered during window, 2) the duration of each state dwell, 3) the standard deviation (error) between dwell times over all states in the interval, 4) median time in each presence state, and 5) mean time in each presence state.

While exemplary embodiments can conduct predictions by using the presence states alone, the predictions can be further enhanced by adding features to the feature set from data collected by software-based activity monitors that detect events from the user device, as shown at 104. These monitors can be extensions to a presence system that periodically captures detailed data on keyboard and mouse activity. The raw data that is collected can be processed into statistical features (See Table 1 for examples of features derived from this data). More generally, such monitors can be embedded within a particular operating system or platform used by the user, or as part of client software the user installs on his or her computer such as a corporate email client, social networking dashboard, or instant messenger contact manager. The number of possible features provided by these monitors is numerous, and is not limited to the examples provided herein. The list in Table 1 is not exhaustive; it is only illustrative of the monitors used in the evaluation of the exemplary embodiments.

As a first step in the learning, the correlation-based feature subset attribute selection method was applied to select salient features separately for each emotional state or communication channel preference. Table 1 summarizes which features were used in classifying each of the mood and preference estimates in the current embodiment. Once features are selected as shown at 105, a classifier for each of the mood and preference estimates is constructed. While many classification algorithms can be used, a decision tree is more resilient to missing data. The resulting decision tree was validated using 10-fold cross validation. Classification is currently done offline, but could be done on demand.

The resulting predictions (0.0-1.0 probability) for the affect states as well as preferred communication channels can be used to inform a user, a set of users, or relayed to a third party person or application. Presentation of this information can be direct, by providing an absolute or descriptive representation on a particular affect scale. For example, indicating that a person's mood is "happy" or "unpleasant" as a descriptive representation. Alternatively, this information can also be provided through more abstract representations. For instance, a smile faced icon can be provided next to a user's name or other visual representation when they are "happy." Conversely, a frowned faced icon can be provided when the user is in an "unpleasant" mood. Similarly, icons with eyes wide open to eyes closed can indicate a user's mood on the arousal dimension from "sleepy" to "aroused."

Evaluation of the exemplary embodiments demonstrated its ability to predict affect and users' preferred communication channel. FIGS. 2(a) to 2(c) illustrate examples of questions in a survey to collect data from a user, in accordance with an exemplary embodiment. For the evaluation, a ground truth dataset was gathered using experience sampling methodology, which asks participants to stop at certain times and make notes of their experience, such as their temporal affective state in real time. Specifically, survey links were sent to participants 5-8 times a day via both text message and email according to participants' working hours. Users were asked to specify their preferred communication channel(s) as shown in FIG. 2(a). FIG. 2(b) illustrates a survey to specify the users willingness to engage in four types of communication requests from workplace colleagues that ranged in communication uncertainty and task complexity. At each sampling moment, users chose a point in the Affect Grid that reflects their mood along two dimensions, as shown in FIG. 2(c). The affect grid is a visual 9 by 9 two-dimensional grid, with a neutral (fifth) row and a neutral (fifth) column. Unpleasant/pleasant affective state forms the horizontal dimension and arousal/sleepiness forms the vertical direction, such that each position on the grid corresponds to a particular pleasure and arousal score.

For each sample in the data, awareness data for the past 20 minutes was considered before the corresponding survey link was sent. The initial set of features that were considered for the evaluation is shown in Table 1. As described above, various possible implementations of the exemplary embodiments can be conducted. One possible implementation includes a system that uses the features derived from presences states of a presence system and the first five features in Table 1, to estimate affect information and communication preferences. Another possible implementation leverages the entire set of features shown in the Table 1. Classification was also performed as described above.

In this evaluation, neutral samples were removed and both the pleasure and arousal dimensions were clustered into two classes (positive and negative) based on affect score in order to obtain high cell counts. The ground truth data set contained approximately 1500 sample points, collected from 23 unique users over a 10 day period.

As described above, an under-sampling technique was performed to address class skew. This method involves randomly removing samples from the majority class so that it has an equal number of instances as the minority class. This avoids having to perform algorithm-dependent methods of correction (e.g., increasing the penalty for misclassification of a minority class point).

TABLE 1

| Feature | P | A | E | T | I | F | M | N | S | X |
|---|---|---|---|---|---|---|---|---|---|---|
| Num. of myUnity States | | | ○ | ● | ○ | ○ | ● | ○ | ○ | ● |
| Duration of a myUnity state | ● | ● | ● | ● | ○ | ● | ● | ● | ● | ● |
| STD Interval of myUnity states | | | | ○ | | | ○ | | | ○ |
| Median Interval of myUnity states | | | | | | | | | ○ | ○ |
| Min Interval of myUnity states | | | | ○ | | | | | | |
| Max motion pixels changed | | | | | | | | | | ○ |
| Median motion pixels changed | ○ | | | | | | | | | |
| STD motion pixels changed | | | | | ○ | | | | | |
| Avg. motion pixels changed | | | | | | | ○ | | | |
| Num. of Focused Wins (Windows) | | | ● | | ○ | | ○ | ○ | ○ | |
| Avg. Interval of Win Switch | ● | ● | | ● | ○ | | ○ | ● | ○ | ○ |
| Median Interval of Win Switch | | | ○ | | ○ | | | | | |
| Max. Interval of Win Switch | | | | | | | | | ○ | ○ |
| Min. Interval of Win Switch | ○ | | ○ | | | | ○ | | ○ | |
| states of Focused Win | ○ | ○ | | ○ | ○ | ● | ○ | ● | ○ | ○ |
| Min. Height of Focused Win | | | | ● | | ○ | ○ | ○ | | |
| Max. Width of Focused Win | | | | ○ | | | | | | |
| Min. Width of Focused Win | | | | | | | | | | ○ |
| Median. Size of Focused Win | | | | ● | | | | | | |
| Avg. Size of Focused Win | | | | | | | | | | ○ |
| Avg. of X-Coord of Focused Win | | | | | ○ | | | | | |
| Min of Y-Coord of Focused Win | | | | | ○ | | | | | |
| Min. of the Max. Sizes of Wins | | | | | | | | | ● | ● |
| Median. Of the Max. Sizes of Wins | | | | | | | | | | ● |
| Avg. of the Max. Sizes of Wins | | | | | | | ● | | | |
| S.D. of the Max. sizes of Wins | | | | | | | | ● | | ○ |
| Max. of the Min. Sizes of Wins | | | | | ○ | | | | ● | |
| Min. of the Min Sizes of Wins | ○ | | | | ○ | | ● | ○ | | |
| Median. of the Min Sizes of Wins | ○ | | | ● | | | | | | |
| Avg. of the Min Sizes of Wins | | | ○ | | ○ | ● | | | ○ | ○ | ○ |
| S.D. of the Min Sizes of Wins | ● | ○ | | | ○ | ○ | ○ | | | |
| Max. of the Median Sizes of Wins | | | | | ○ | | ○ | | ○ | |
| Median of the Median sizes of Wins | ○ | | ○ | | | | | | | |
| S.D. of the Median sizes of Wins | | | | | | | | ○ | | |
| Avg. of the Avg. sizes of Wins | | | | ○ | | | | | | |
| S.D. of the Avg. sizes of Wins | | | | | | | | | | ○ |

TABLE 1-continued

| Feature | P | A | E | T | I | F | M | N | S | X |
|---|---|---|---|---|---|---|---|---|---|---|
| Max. Num. of Maximized Wins | | | | | ● | | | | ○ | |
| Min. Num. of Maximized Wins | | | | ○ | | ○ | | ○ | ○ | |
| Avg. Num. of Maximized Wins | | | | ○ | | | | | | |
| S.D. Num. of Maximized Wins | ● | | | | | | | | | |
| Max. Num. of Minimized Wins | | | | | | | ○ | | | |
| Median. Num. of Minimized Wins | ○ | | | ○ | | | | | | |
| S.D. Num. of Minimized Wins | | | | | | | | | ○ | |
| Min. Num. of Normal Wins | | | | | | | | ○ | | |
| S.D. Num. of Normal Wins | ○ | | | | | | | | | |
| Num. of Backspace | | | | ○ | | | ○ | | | |
| Num. of Keystroke | | | | | ○ | | | | | |
| Min. Velocity of Mouse | | | | | ○ | ○ | | | | |
| Median Velocity of Mouse | ○ | | | | | | | | | |
| Median. Acceleration of Mouse | | | | | | | | | ○ | ○ |
| Jerk Index of Mouse | ○ | | | | | ● | ○ | | ○ | |

For each sample in the data, the evaluation of the exemplary embodiments considered usage data of a presence state system and computer usage data for the 10 and 20 minutes, respectively, prior to when the corresponding survey link was sent. Only 43.6% and 72.4% of the samples had data from keyboard activity and mouse activity respectively, indicative of the fact that workers do not use their keyboard and mouse all the time. Finally, all features are normalized for each participant using z-scores to account for individual differences.

The correlation-based feature subset attribute selection method was applied to select salient features for each estimation model separately. To handle missing values in the features of the dataset, a Decision Tree classifier was utilized. The decision tree is constructed by selecting the node with the highest information gain as the root node, then continuing the calculation recursively. Decision trees were implemented with a 15% confidence threshold for pruning.

To evaluate performance, 10-fold cross validation was employed.

Figure 3:
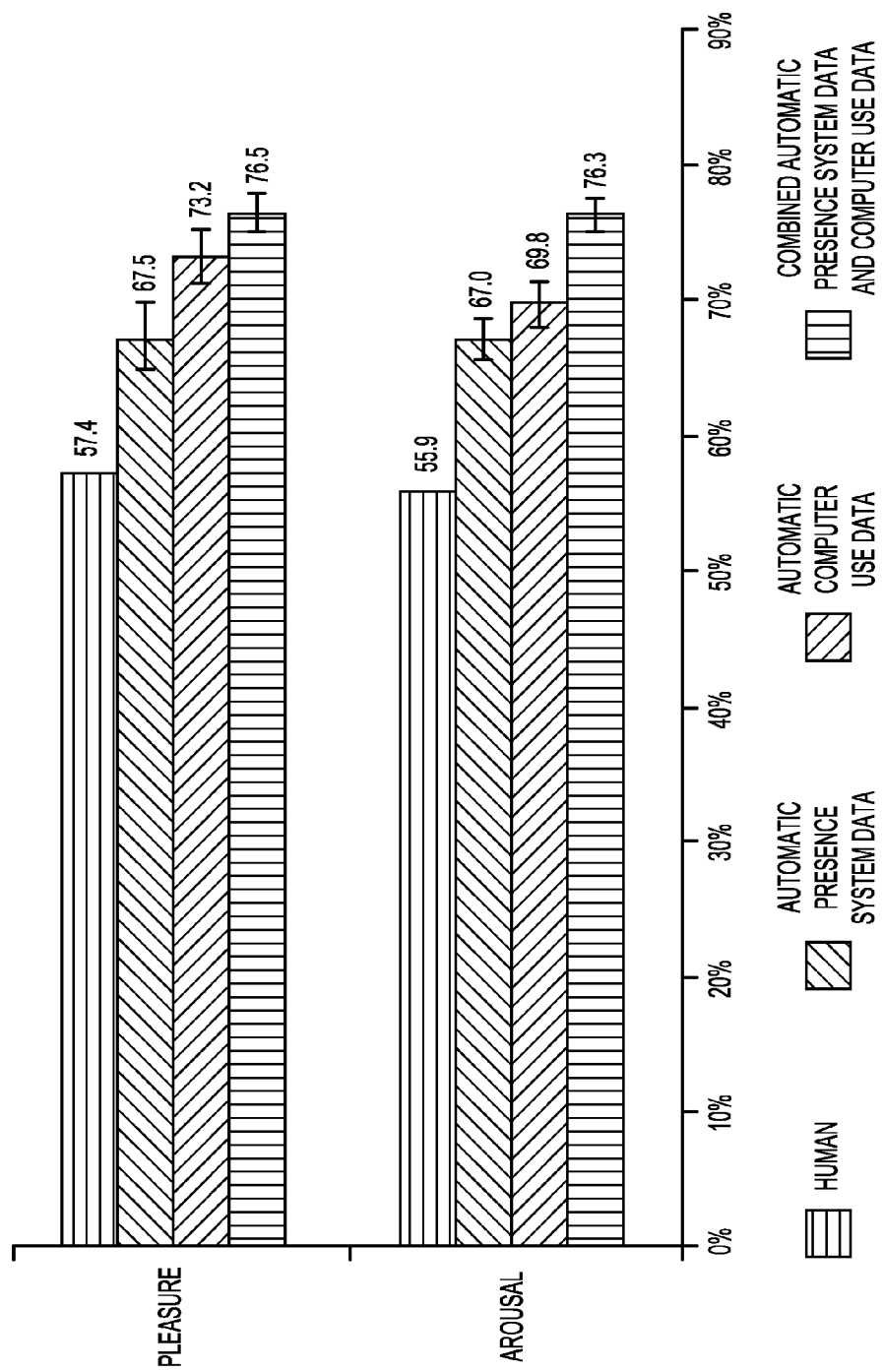
FIG. 3 illustrates a performance comparison for classifiers on affect states of pleasure and arousal.

FIG. 3 illustrates a comparison of the performance of classifiers systems for affect states of pleasure and arousal. The error bars represent the standard deviation in classification rates after 10 random under-samplings. FIG. 3 shows that the overall accuracy for estimating pleasure in the evaluation of the exemplary embodiments is 76.5% (true-positive (TP) rate 76.1%, true-negative (TN) rate 76.9%). For arousal, the evaluation of the exemplary embodiments reached an overall accuracy of 76.4% (TP rate 74.5%, TN rate 78.1%). The estimation accuracy exceeded human performance.

As indicated in Table 1, features related to presence states and users' desktop information were frequently selected to construct prediction models and that these features were often located in the top 3 levels of nodes in decision trees for most prediction models. This indicates that the two types of features have higher information gain than other features, such as keyboard and mouse information. For example, the feature "duration of a state" was used to construct all prediction models and it was located in the top 3 levels of nodes in decision trees. In contrast, the feature "number of keystrokes" was only selected in the models of preference for IM and face-to-face communication. The poor predictive power of keystroke data is likely due to the fact that keyboard use throughout a workday is not persistent in the data set we collected.

Figure 4:
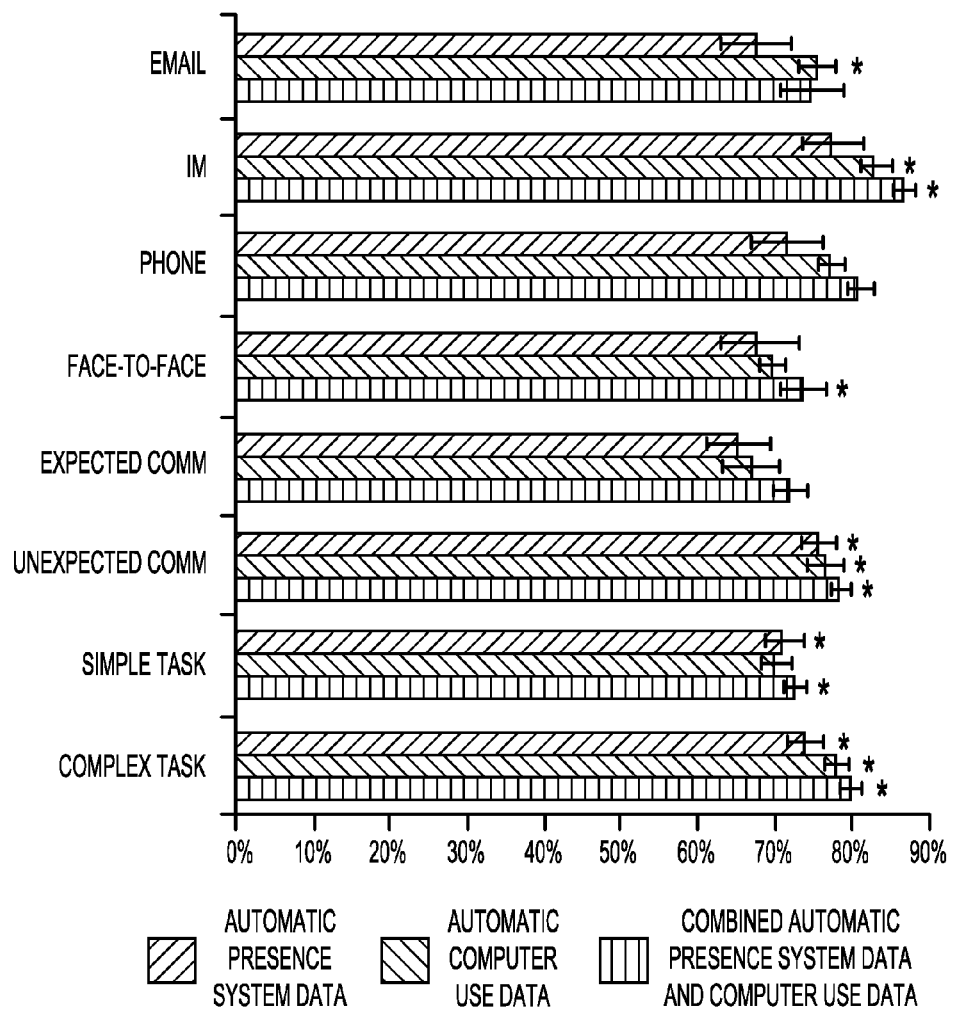
FIG. 4 illustrates the accuracy performance of classifiers on media and request preferences.

FIG. 4 illustrates the accuracy performance of classifiers on media and request preferences. Error bars represent the standard deviation in classification rates after 10 random under-samplings. Asterisk "*" represent that TP rate >70%, TN rate >70% for each class. Awareness data can be used to directly estimate participants' preferences for communication channels, as illustrated in FIG. 4. Using presence state data alone can achieve accuracy higher than 70% for the preference of phone, IM, and face-to-face communication. The accuracy is increased above 80% for IM and phone by considering both presence state and computer usage data.

More importantly, the awareness data can also be applied to estimate preference for communication and task requests in workplace communication, going beyond predicting just channel preference. It can help workers decide when to initiate a communication as well as assist in forming communication strategies. Specifically, presence data alone can reach an accuracy of over 70% for preferences for unexpected communication, and requests for simple and complex tasks. The accuracy is improved to over 80% for preference of complex task request when considering both presence and computer usage data, as shown in FIG. 4.

The prediction model does not perform well on willingness to accept an expected communication request. One possible reason is that the dataset used in evaluating the exemplary embodiments for expected communication requests contains few examples of the negative class. However, users accept these requests most of the time, reducing the overall utility of such a model. In contrast, the accurate prediction of unexpected communication requests by the exemplary embodiments is more meaningful to users.

The exemplary embodiments demonstrate one instance of a general class of systems for using presence data to estimate users' affect and communication preferences. Other mood and communication preferences could be estimated from presence data by the methods described above. Other sorts of presence data, and other features derived from the presence data, could be used in the estimates from additional high level presence states to user usage data on other devices, for example. Other preprocessing and different time windows could be used. Similar methods could also be applied to estimate overall mood and communication preferences for groups of people.

Figure 5:
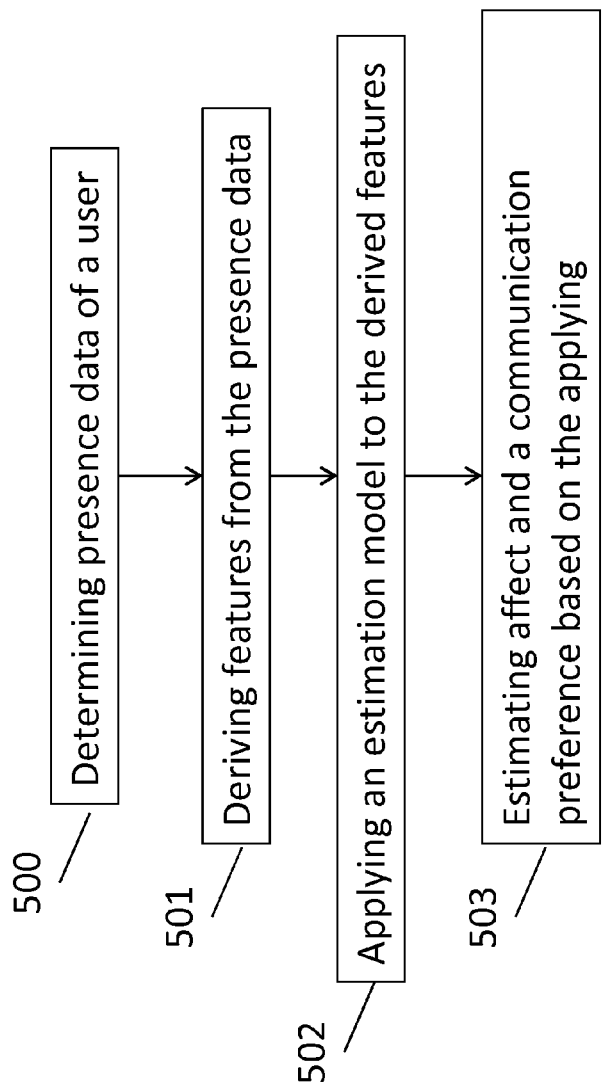
FIG. 5 illustrates a flowchart in accordance with an exemplary embodiment.

FIG. 5 illustrates a flowchart in accordance with an exemplary embodiment. Exemplary embodiments may first determine presence data of a user 500, derive features from the presence data 501, apply an estimation model to the derived features 502; and estimates affect and a communication preference based on the applying 503.

Figure 6:
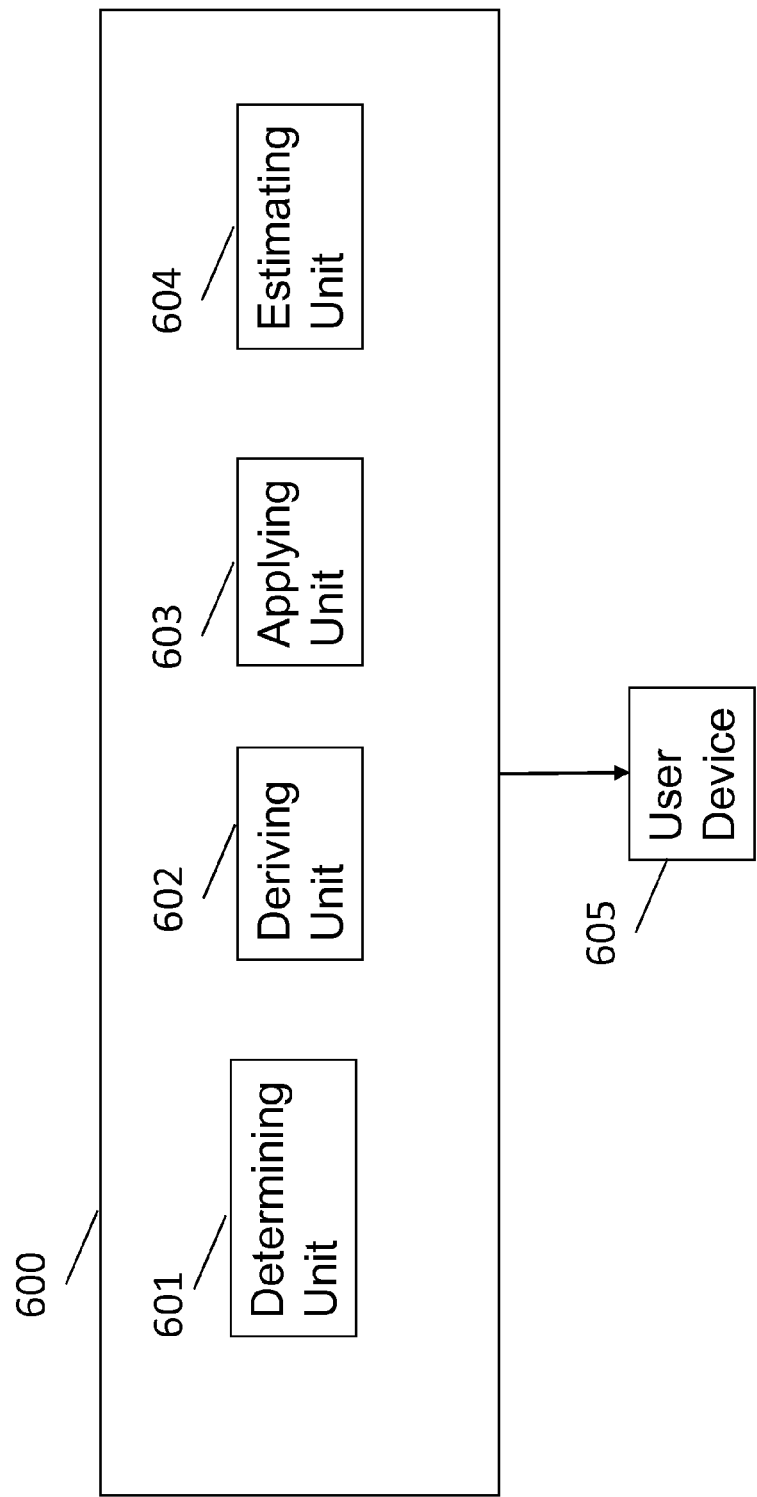
FIG. 6 illustrates a functional diagram in accordance with an exemplary embodiment.

FIG. 6 illustrates a functional diagram in accordance with an exemplary embodiment. In an implementation of an exemplary embodiment, an apparatus 600 may include a determining unit 601 that determines presence data of a user, a deriving unit 602 that derives features from the presence data, an applying unit 603 that applies an estimation model to the derived features; and an estimating unit 604 that estimates affect and a communication preference based on the applying. Presence data may be derived from a user device 605. The units may be executed by one or more processors.

Figure 7:
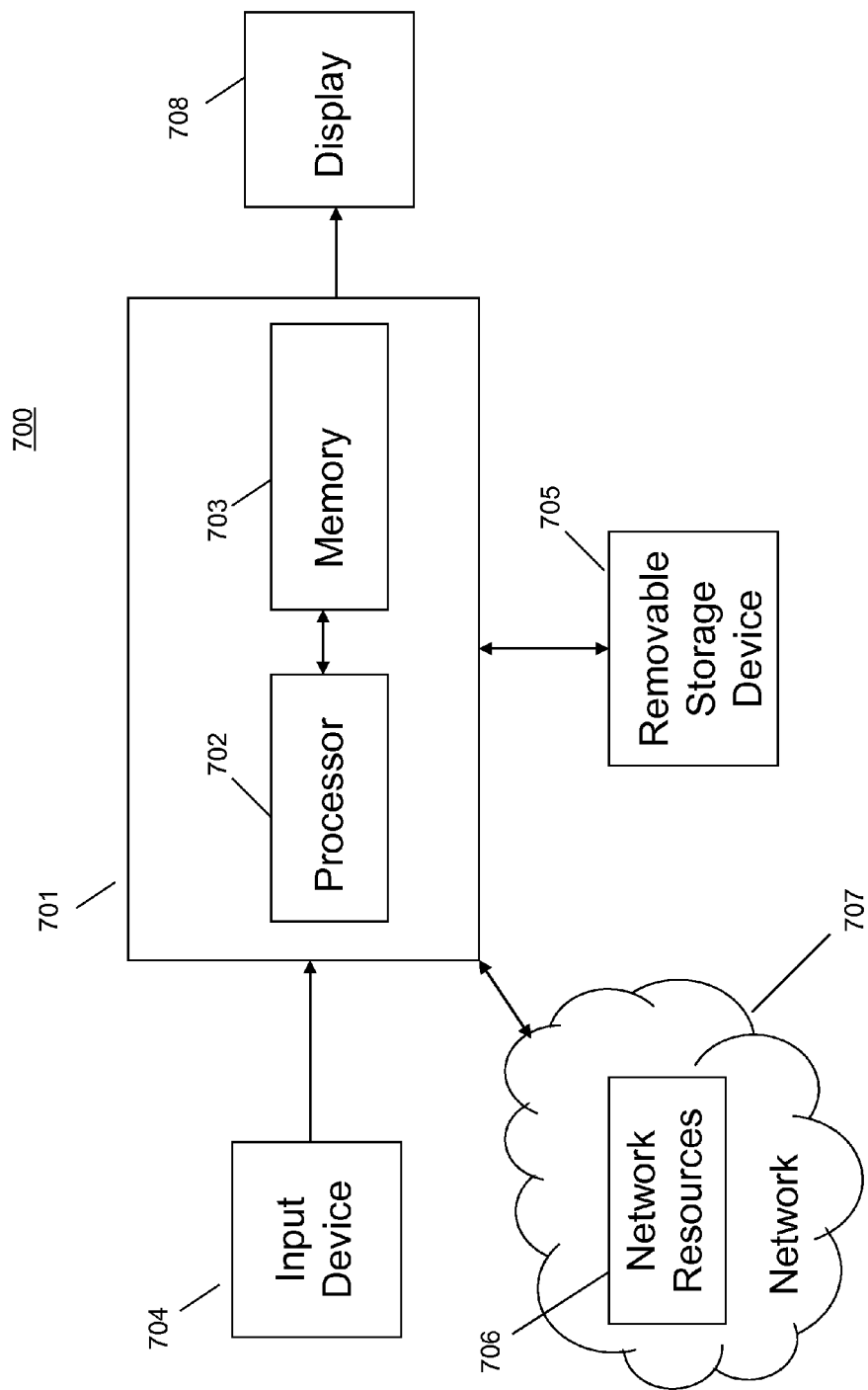
FIG. 7 is a block diagram that illustrates an embodiment of a computer/server system upon which an embodiment of the inventive methodology may be implemented.

FIG. 7 is a block diagram that illustrates an embodiment of a computer/server system 700 upon which an embodiment of the inventive methodology may be implemented. The system 700 includes a computer/server platform 701 including a processor 702 and memory 703 which operate to execute instructions, as known to one of skill in the art. The term "computer-readable medium" as used herein refers to any medium that participates in providing instructions to processor 702 for execution. Additionally, the computer platform 701 receives input from a plurality of input devices 704, such as a keyboard, mouse, touch device or verbal command. The computer platform 701 may additionally be connected to a removable storage device 705, such as a portable hard drive, optical media (CD or DVD), disk media or any other medium from which a computer can read executable code. The computer platform may further be connected to network resources 706 which connect to the Internet or other components of a local public or private network. The network resources 706 may provide instructions and data to the computer platform from a remote location on a network 707. The connections to the network resources 706 may be via wireless protocols, such as the 802.11 standards, Bluetooth® or cellular protocols, or via physical transmission media, such as cables or fiber optics. The network resources may include storage devices for storing data and executable instructions at a location separate from the computer platform 701. The computer interacts with a display 708 to output data and other information to a user, as well as to request additional instructions and input from the user. The display 708 may therefore further act as an input device 704 for interacting with a user.

Moreover, other implementations of the exemplary embodiments will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A method, comprising:
    determining presence data of a user;
    deriving features from the presence data;
    applying an estimation model to the derived features;
    estimating an effect of a communication on a user based on a result of the applying; and
    estimating a communication preference of the user based on the result of the applying,
    wherein the presence data comprises at least one of a presence state indicating the user is in an office, a presence state indicating the user is in a building, a presence state indicating the user is connected remotely, a presence state indicating the user is available on a mobile device, a presence state indicating the user is with a visitor, and a presence state indicating there is no information about the user.

2. The method of claim 1, wherein the applying the estimation model comprises estimating pleasure and arousal.

3. The method of claim 1, further comprising recommending a communication medium based on the estimated affect.

4. The method of claim 1, further comprising displaying the estimated effect of the communication on the user in a communication application.

5. The method of claim 1, further comprising displaying the estimated communication preference on a communication application.

6. The method of claim 1, wherein the presence data comprises a stream of presence states from a presence estimation system.

7. The method of claim 1, further comprising collecting data of user input on a user device and deriving features on the collected data.

8. The method of claim 1, wherein the presence data further comprises a date and time corresponding to the presence state.

9. A non-transitory computer readable medium storing instructions for execution by a processor, comprising:
    determining presence data of a user;
    deriving features from the presence data;
    applying an estimation model to the derived features;
    estimating an effect of a communication on a user based on a result of the applying; and
    estimating a communication preference of the user based on the result of the applying,
    wherein the presence data comprises at least one of a presence state indicating the user is in an office, a presence state indicating the user is in a building, a presence state indicating the user is connected remotely, a presence state indicating the user is available on a mobile device, a presence state indicating the user is with a visitor, and a presence state indicating there is no information about the user.

10. The non-transitory computer readable medium of claim 9, wherein the applying the estimation model comprises estimating pleasure and arousal.

11. The non-transitory computer readable medium of claim 9, further comprising recommending a communication medium based on the estimated affect.

12. The non-transitory computer readable medium of claim 9, further comprising displaying the estimated effect of the communication on the user in a communication application.

13. The non-transitory computer readable medium of claim 9, further comprising displaying the estimated communication preference on a communication application.

14. The non-transitory computer readable medium of claim 9, wherein the presence data comprises a stream of presence states from a presence estimation system.

15. The non-transitory computer readable medium of claim 9, further comprising collecting data of user input on a user device and deriving features on the collected data.

16. An apparatus, comprising:
    a processor comprising:
        a determining unit that determines presence data of a user;
        a deriving unit that derives features from the presence data;
        an applying unit that applies an estimation model to the derived features and outputs a result; and
        an estimating unit that estimates an effect of a communication on a user based on the result and estimates a communication preference of the user based on the result,
        wherein the presence data comprises at least one of a presence state indicating the user is in an office, a presence state indicating the user is in a building, a presence state indicating the user is connected remotely, a presence state indicating the user is available on a mobile device, a presence state indicating the user is with a visitor, and a presence state indicating there is no information about the user.

17. The apparatus of claim 16, wherein the applying unit applies the estimation model by estimating pleasure and arousal.

18. The apparatus of claim 16, further comprising a recommending unit that recommends a communication medium based on the estimated affect.

19. The apparatus of claim 16, further comprising a displaying unit that displays estimated effect of the communication on the user in a communication application.

20. The apparatus of claim 16, further comprising a displaying unit that displays the estimated communication preference on a communication application.

21. The apparatus of claim 16, wherein the presence data comprises a stream of presence states from a presence estimation system.

\* \* \* \* \*